United States Patent
Salmi et al.

(12) 
(10) Patent No.: US 7,112,279 B2
(45) Date of Patent: Sep. 26, 2006

(54) ARRANGEMENT AND METHOD FOR COLLECTING OIL

(75) Inventors: Pekka Salmi, Vantaa (FI); Erkki Mykkanen, Espoo (FI)

(73) Assignees: Aker Yards Oy, Turku (FI); Suomen Ymparistokeskus, Helsinki (FI)

( * ) Notice: Subject to any disclaimer, the term of this patent is extended or adjusted under 35 U.S.C. 154(b) by 65 days.

(21) Appl. No.: 10/496,355

(22) PCT Filed: Nov. 14, 2002

(86) PCT No.: PCT/FI02/00904

§ 371 (c)(1),
(2), (4) Date: Jun. 23, 2004

(87) PCT Pub. No.: WO03/043878

PCT Pub. Date: May 30, 2003

(65) Prior Publication Data

US 2005/0051501 A1 Mar. 10, 2005

(30) Foreign Application Priority Data

Nov. 21, 2001 (FI) .................................. 20012276

(51) Int. Cl.
*E02B 15/04* (2006.01)
(52) U.S. Cl. .................................. 210/242.3; 210/923
(58) Field of Classification Search ............. 210/242.1, 210/242.3, 170, 923
See application file for complete search history.

(56) References Cited

U.S. PATENT DOCUMENTS

| | | | | |
|---|---|---|---|---|
| 4,033,876 A | * | 7/1977 | Cocjin et al. ............ | 210/242.3 |
| 4,120,793 A | * | 10/1978 | Strain ...................... | 210/923 |
| 4,308,140 A | * | 12/1981 | Pierson, Jr. ............. | 210/242.3 |
| 4,348,282 A | * | 9/1982 | Fries et al. .............. | 210/242.3 |
| 4,595,510 A | * | 6/1986 | Winbladh et al. ....... | 210/242.3 |
| 4,959,143 A | * | 9/1990 | Koster ..................... | 210/242.3 |
| 5,047,156 A | * | 9/1991 | Sullivan ................... | 210/242.3 |
| 5,824,231 A | | 10/1998 | Blomberg | |
| 6,592,765 B1 | * | 7/2003 | Mykkanen ............... | 210/242.3 |

FOREIGN PATENT DOCUMENTS

| | | |
|---|---|---|
| DE | 43 02 253 | 8/1994 |
| EP | 0 017 168 | 10/1980 |
| EP | 0 043 111 | 1/1982 |
| EP | 0 129 279 | 12/1984 |
| FI | 85528 | 5/1989 |

\* cited by examiner

*Primary Examiner*—Christopher Upton
(74) *Attorney, Agent, or Firm*—Smith-Hill and Bedell

(57) ABSTRACT

The invention relates to an arrangement and a method for collecting oil from water in open water and/or winter conditions, whereby a vessel's hull and oil collecting equipment are utilized as an oil collector. According to the invention, the oil collecting equipment is attached to the vessel's hull and it is equipped with an auxiliary device, which comprises at least two auxiliary means which are interconnected so that they are movable with respect to each other. The auxiliary means can be utilized in various ways in different conditions.

13 Claims, 3 Drawing Sheets

ARRANGEMENT AND METHOD FOR COLLECTING OIL

Figure 1:
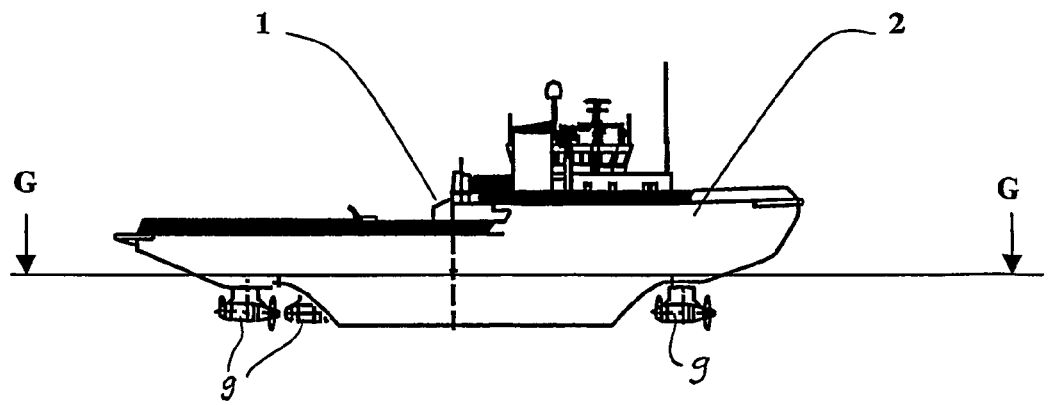

This is a national stage application filed under 35 USC 371 based on International Application No. PCT/FI2002/000904 tiled Nov. 14, 2002, and claims priority under 35 USC 119 of Finnish Patent Application No. 20012276 filed Nov. 21, 2001.

The invention relates to an arrangement for collecting oil from water in open water and/or winter conditions.

Solutions are already known, by means of which oil is collected mechanically from the surface of the sea. Mechanical oil collecting is also the oil spill prevention method recommended by the Baltic Marine Environment Protection Commission in the Baltic Sea area. As an oil collector can function e.g. a collector floating independently, which has been described in patent publication FI 73029. In this publication, oil is collected from water and ice inside a device through holes therein.

A separate oil collecting means to be attached to the vessel and collecting oil with the help of bristles to a water flow channel arranged in a vessel, is disclosed in patent publication FI 85528.

The prior art has considerable disadvantages. Probably the most serious disadvantage is, that they are difficult to adapt to oil collecting in hard wind and rought seas. In addition, oil collecting with the known solutions is slow. Therefore wind velocity of 10–15 m/s and significant wave height of 1.5 m are used as limiting values of the environmental conditions. When these limiting values are exceeded, the collecting is interrupted or its efficiency is significantly lowered and the risk for the oil collecting equipment to be damaged will increase. Furthermore, booms are generally used for collecting oil and for leading it to collecting device and due to their susceptibility to damages, the collecting speed is lmited to 1.5 knots at maximum. A speed higher than this also makes the oil escape underneath the boom.

Further from publication DE 2843952 A1 is known a solution, in which the vessel's hull is used as an oil collector. The hull of the vessel is more durable and higher than the fabric or rubber structure boom used in previous structures. The strength of the structure enables raising of the collecting speed and makes the oil collecting possible in weather conditions and ice conditions considerably worse than before. The height of the broad side of the vessel to be used as an oil collector also hinders the oil from escaping underneath the vessel's broad side or underneath a device connected thereto, making possible also the use of a higher collecting speed. The disclosed known solution is, however, quite theoretical and no attention has been paid to oil collecting in different conditions like in open water as well as in winter conditions, in which case there are blocks of ice in the water.

It's an aim of the invention to eliminate the disadvantages related to the prior art and to provide a new solution suitable for a more efficient oil collecting and for various kinds of weather conditions.

The invention is based on the idea, that when the vessel is moving to a direction, which can be freely chosen at a certain angle with respect to the direction of the vessel's bow, the vessel's broad side acts for its part as an oil collector. Further, an oil collecting equipment is attached to the vessel's hull, including an oil collecting means for separating oil from water and an auxiliary device for leading the oil to be separated to the oil collecting means. The oil collecting means known per se can comprise e.g. a brush cleaner. For intensifying the oil collecting, the auxiliary device comprises at least two auxiliary means, which are interconnected so that they are movable with respect to each other. Consequently, it can be chosen which auxiliary means are used in each case and in which way, whereby, when the vessel is advantageously steered at an appropriate propagation angle, oil can be collected optimally from an area as wide as possible in different conditions.

During oil collecting, the auxiliary device may be located mainly outside the vessel's hull. Alternatively, under certain conditions, it may be partly or entirely inside the vessel's hull and/or on the deck of the vessel. The auxiliary device may be fixed to the vessel's hull and forms part of it or it may be installed separately. Oil collecting can also be intensified so that the auxiliary device is located at the rear end of the vessel's hull, in which case the widest possible collecting width is obtained.

In practice, the auxiliary means included in the auxiliary device may be functionally connected so that they form a uniform wall, hatch or the like. This kind of solution is well adapted to open water conditions.

The auxiliary means included in the auxiliary device advantageously comprise two different-sized walls, hatches or the like. In this case, the smaller one of the said auxiliary means is preferably arranged inside the bigger one so that it can be turned separately inside the vessel's hull for winter use. The auxiliary means can be advantageously arranged to turn in relation to the same stub shaft.

Furthermore, for winter use, the oil collecting equipment can be advantageously provided with a device for separating oil from ice prior to feeding it to the oil collection means. In practice, the said oil separating device may comprise an inclined plane, the inclined bottom of which is arranged below the said smaller auxiliary means.

The turning angle of the auxiliary means may be adjusted in some convenient manner e.g. mechanically, hydraulically, pneumatically, electrically or electromechanically and the vessel itself is steered advantageously at a certain propagation angle with respect to its direction of travel. The steering process may, when required, be automated by taking account of the ship's direction of travel, force of the wind, height of the wave etc. criteria, so that oil collecting can be carried out in an optimal way according to the calculations performed.

Advantageously, the vessel's broad side functioning as an oil collector is as straight as possible, possibly even a little bit concave, in form. E.g. icebreakers and passenger ships can be used as the oil collecting vessel. The so-called inclined icebreaker is considered to be the most suitable and it being especially designed to be steered effectively sideways even at large propagation angles with respect to its direction of travel. For this purpose the vessel is advantageously asymmetrical with respect to its longitudinal direction and further equipped with steering propulsion devices placed both on the rear side and bow side, with the help of which the vessel can be steered, if necessary, both forwards and backwards.

A second aspect of the invention relates to the method for applying the present arrangement. According to the invention, the vessel's hull is utilized for collecting oil and breaking ice and is equipped with an oil collecting equipment including, in addition to an oil collecting means known per se, also at least two auxiliary means, with the help of which the oil is led to the oil collecting means. The auxiliary means can be independently adjusted, if necessary. In this case a functionally uniform wall or hatch can be formed to the vessel's broad side, which is turned to a certain angle outwards with respect to the vessel's side, thus providing a more efficient oil collecting in open water conditions. On the other hand in winter conditions, when there may be ice in the water, advantageously only one, advantageously the smaller-sized, of the auxiliary means is used. If this auxiliary means is additionally turned inside the hull, the oil or the oily water may be collected to the vessel without exposing the hatch or the corresponding auxiliary means in question to stress caused by the ice.

For intensifying the oil collecting, the vessel is preferably steered so that its centre line forms, depending on the propagation speed, the most preferable propagation angle with respect to the vessel's direction of travel from the viewpoint of oil collecting. From the view point of the collecting width it is, of course, advantageous that the auxiliary means for collecting the oil are located possibly far at the rear of the vessel at the broad side thereof.

In open water, the said propagation angle (E;F) is chosen preferably within the range 20°–70°, whereby the angle of the auxiliary means (10a) with respect to the vessel's broad side (3) is at least 20°–70° and at the most 40–140°. Correspondingly, in winter conditions the propagation angle (E;F) is chosen preferably within the range 0°–30°, whereby one auxiliary means (10a) is not opened and the other auxiliary means (10b) is opened entirely.

In case the said two auxiliary means comprise two different-sized interconnected auxiliary means, in winter conditions the smaller-sized is advantageously turned inside the hull.

The separation of oil form ice can take place e.g. with a known device fastened outside the board like e.g. with the device according to patent FI 106969, which presses the ice under water and separates the oil from the ice and leads the oily water to a collector outside or inside the hull, in which the oil is separated from the water by using a technique known per se.

Considerable advantages can be obtained with the invention. Thus with the present invention, the collecting speed can be considerably raised, which enables collecting of oil from a larger area per time unit. It is possible to perform the oil collecting in open water weather conditions far worse than before, but it can also be done in winter ice conditions.

Figure 2:
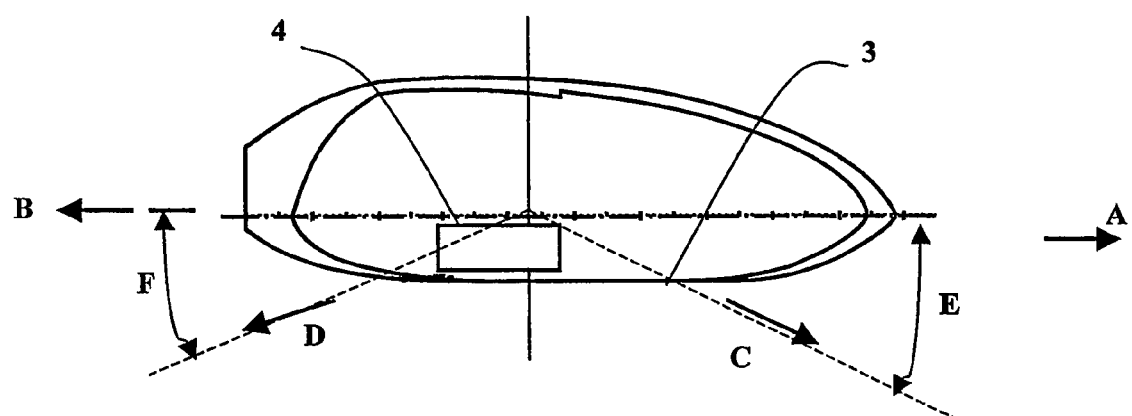
Figure 3:
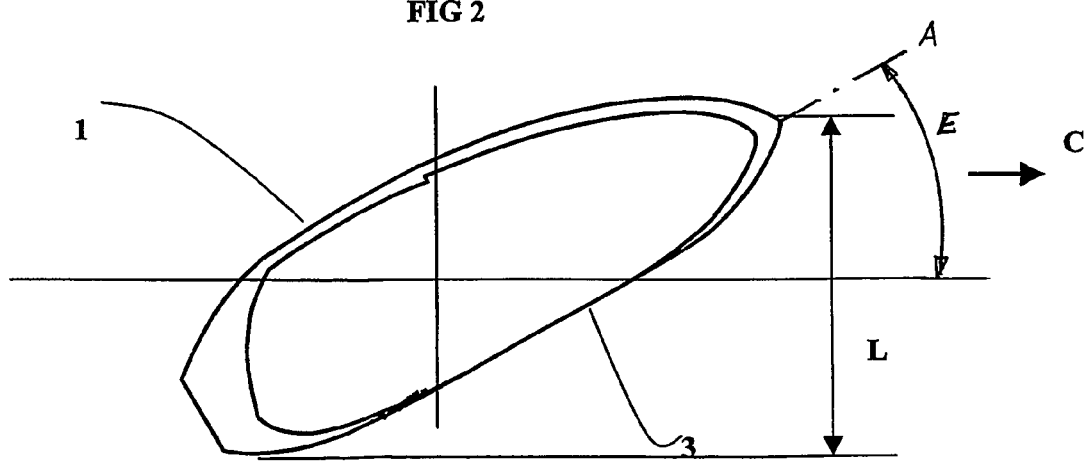
Figure 4:
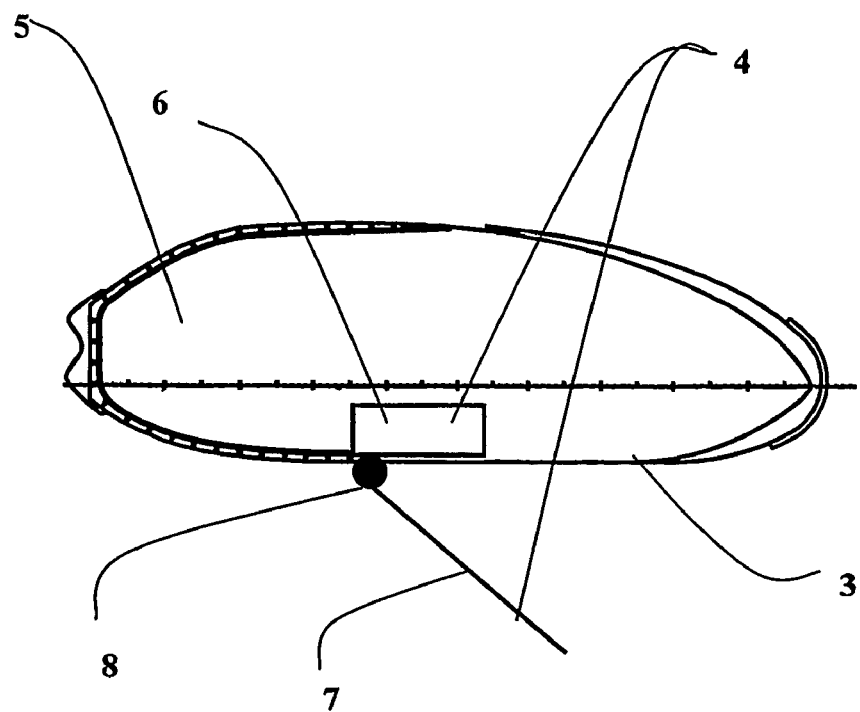
Figure 5:
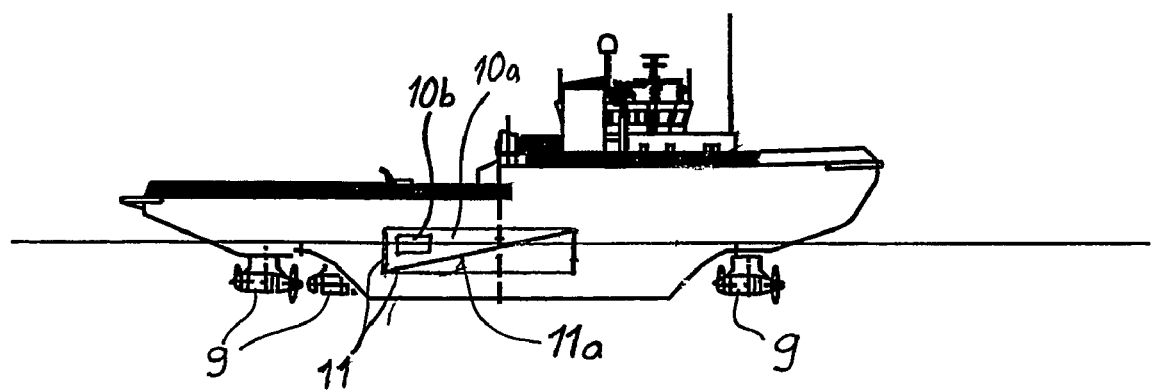
Figure 6:
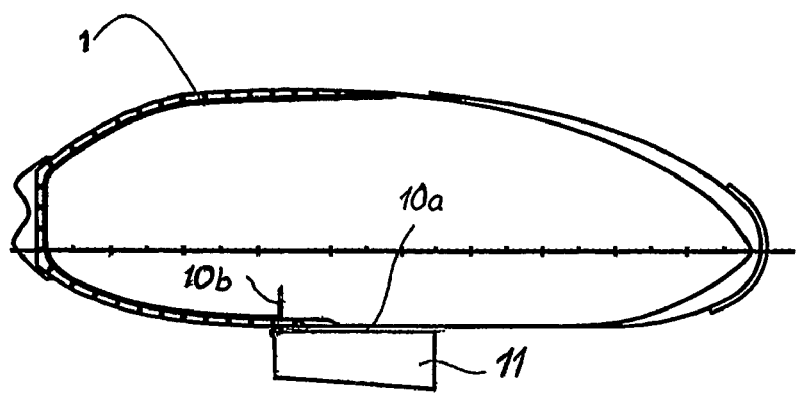
Figure 7:
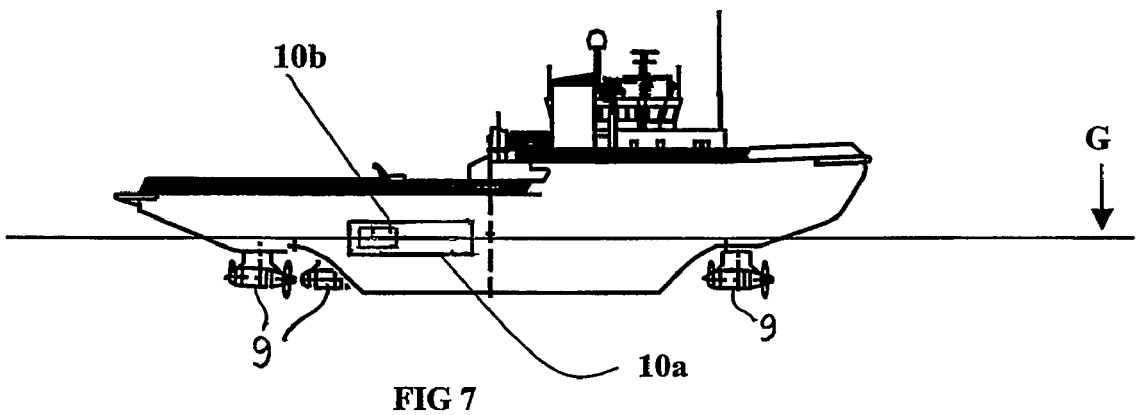
Figure 8:
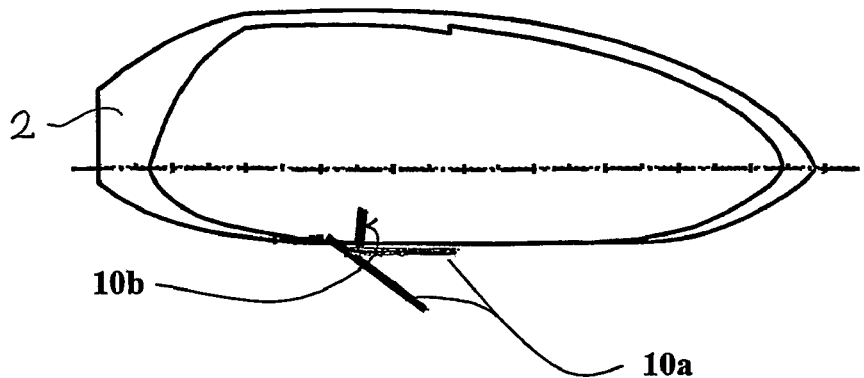

The invention is described below, by way of example, with reference to the accompanying drawings, in which:

FIG. 1 shows side view of a vessel suitable for oil collecting according to the invention, FIG. 2 shows a section along line G—G of the vessel of FIG. 1, FIG. 3 shows the vessel's motion at a certain propagation angle with respect to its direction of motion, FIG. 4 shows a schematic illustration of the vessel from above, the auxiliary means turned open, FIG. 5 shows sideways an auxiliary device added to the vessel, FIG. 6 shows a device according to FIG. 5 viewed from above, FIG. 7 shows sideways an alternative auxiliary device added to the vessel, FIG. 8 shows the auxiliary device of FIG. 7 viewed from above and in different kinds of operating positions.

An oil collecting arrangement comprises a vessel 1, which is equipped with an oil collecting equipment 4. The equipment includes an oil collecting means known per se, e.g. a collection belt functioning with bristles, which separates the oil from the surface of the water and leads it to oil collecting tanks located inside the vessel (not shown in more detail in the Figures). In FIG. 1, the vessel's hull as a whole is indicated with number 2 and the water surface with the arrows G. The propulsion devices steering the vessel are marked with the reference 9. With these the vessel can be steered to different directions of travel.

In FIG. 2, there is shown separately the ship's advantageously quite straight broad side 3, which is utilized for obtaining the best possible oil collecting result. In addition to the equipment 4, there is marked with the arrow A in the figure the vessel's normal direction of travel and with the arrow B the vessel's direction of travel in exceptional cases, e.g. when breaking the ice. In order to be able to collect oil as efficiently as possible, the vessel is steered in the direction C i.e. there is a deviation of an angle E with regard to the normal steering direction. Correspondingly, if the conditions so require, the vessel is steered in the direction D i.e. there is a deviation of an angle F with regard to the prevailing travelling direction. In this connection, the angles E and F are called the propagation angles of the vessel.

The FIG. 3 shows the vessel moving diagonally sideways at the propagation angle E in direction C, whereby the purpose is to reach an oil collecting area L as wide as possible for collecting oil optimally by utilizing the vessel's broad side 3 and by taking account of, as far as possible, also e.g. the force of the wind, the height of the wave etc. The oil collecting area can be broadened if the oil collecting equipment 4 is located at the rear part of the vessel.

The FIG. 4 shows an oil collecting equipment 4, which comprises an auxiliary device 7 and an oil collecting means 6, which is located either inside the vessel or on deck 5 thereof. The auxiliary device 7 is turnably supported to the vessel's broad side 3 at a fixing point 8. The auxiliary device 7 may, according to the need, alternatively be supported also from the other end thereof e.g. in a solution, which is used when the vessel is advancing diagonally backwards i.e. to the direction marked with D in FIG. 2. In addition, it is possible to use an auxiliary device 7, which is made of two different parts and each part is fixed to opposite sides of an opening in the hull.

The FIG. 5 shows sideways the auxiliary means connected to the vessel, which includes a bigger hatch or the like 10a and a smaller hatch or the like 10b. The vessel is further equipped with a device 11 for separating oil from ice prior to leading it to the oil collecting means. In FIG. 6, the solution is viewed from above. The device 11 can be at its simplest an inclined plane, the lower surface 11a of which prevents ice from entering through the hatches 10a and 10b. In case of FIG. 6, typically in winter conditions, the bigger hatch 10a is entirely closed and the smaller hatch 10b is turned inside the vessel's hull.

The FIG. 7 shows a modified version of the invention, which includes also a two-part auxiliary means 10a, 10b and which can also be used for collecting oil both in summer and in winter. In summertime, both parts 10a and 10b are advantageously opened simultaneously. In winter, with advantage only one of the auxiliary means, the smaller one 10b, is used for oil collecting.

The FIG. 8 shows the solution of FIG. 7 viewed from above, in different operating positions of the auxiliary means. In other words, for collecting oil according to the conditions, both auxiliary means 10a and 10b may be open, and especially in winter conditions, the bigger auxiliary means 10a may be entirely closed and the smaller auxiliary means 10b may be turned inside the vessel's hull 2.

Within the scope of invention, also solutions different from the above-described ones are feasible. There may be several different auxiliary means i.e. hatches or the like, which may be in different ways turnably supported to the vessel's hull and/or to each other. Above, the invention is applied mainly to an icebreaker or a tugboat, but nothing prevents applying the same kind of solution to ordinary vessels e.g. merchant ships or passenger ships. Therefore, separate components, that can even be detachable either form the vessel's hull or attached and detached e.g. from aboard of the vessel, can be used as an auxiliary device. The dimensions of the auxiliary device may, of course, vary a great deal. Also, the material of the auxiliary device may be any material appropriate for the purpose like e.g. different kinds of metals, plastics or combinations thereof.

Consequently, the invention is not limited to the embodiments shown, but several modifications of the invention are feasible within the scope of the attached claims.

The invention claimed is:

1. A vessel comprising:
a hull having a broad side and formed with an opening in the broad side of the hull,
an oil separating means for receiving oil and water and separating the oil from the water, and
an auxiliary device for cooperating with the hull to collect oil and lead the oil and water to the oil separating means, wherein the auxiliary device comprises at least two wall members that are interconnected so that they are movable with respect to each other, the auxiliary device, when in a closed position, forms part of tho hull, and the hull has a rear end and a forward end and the auxiliary device is attached to the hull at the rear end thereof.

2. A vessel according to claim 1, wherein the auxiliary device is attached to the hull at a broad side thereof.

3. A vessel according to claim 1, wherein the oil separating means is located at least partly inside the hull of the vessel.

4. A vessel according to claim 1, wherein the oil separating means is located on a deck of the vessel.

5. A vessel according to claim 1, wherein the oil separating means is attached to the hull in a manner allowing detachment of the oil separating means from the hull.

6. A vessel according to claim 1, wherein the auxiliary device is attached to the hull in a manner allowing turning movement of the auxiliary device relative to the hull.

7. A vessel comprising:
a hull having a broad side and formed with an opening in the broad side of the hull,
an oil separating means for receiving oil and water and separating the oil from the water, and
an auxiliary device for cooperating with the hull to collect oil and lead the oil and water to the oil separating means, wherein the auxiliary device comprises a larger wall member formed with an opening and a smaller wall member that is connected to the larger wall member in a manner such that in a first position the smaller wail member blocks the opening in the larger wall member and in a second position the smaller wall member is turned inward of the larger wall member relative to the hull.

8. A vessel according to claim 7, wherein the hull is formed with an opening in a broad side of the hull and the larger wall member is turnable relative to the hull between a first position in which it blocks the opening in the broad side of the hull and a second position in which it is deployed outboard of the hull.

9. A vessel according to claim 8, wherein the auxiliary device has a first operational condition in which the larger wall member is in its first position and the smaller wall member is in its first position and the auxiliary device blocks the opening in the broad side of the hull and the smaller wall member blocks the opening in the larger wall member, a second operational condition in which the larger wall member is in its first position and the smaller wall member is in its second position, and a third operational condition in which the larger wall member is in its second position and the smaller wall member is in its first position.

10. A vessel according to claim 7, comprising a device for separating oil from ice present in the water prior to feeding the oil to the oil separating means, the oil separating device having a bottom wall that is inclined to horizontal and is located below the smaller wall member.

11. A vessel comprising:
a hull having a broad side and formed with an opening in the broad side of the hull,
an oil separating means for receiving oil and water and separating the oil from the water, and
an auxiliary device for cooperating with the hull to collect oil and lead the oil and water to the oil separating means, wherein the auxiliary device is turnable relative to the hull according to the vessel's direction of travel, the auxiliary device comprises at least two wall members that are interconnected so that they are movable with respect to each other, the auxiliary device, when in a closed position, forms part of the hull, the hull has first and second opposite longitudinal broad sides that are asymmetrical with respect to each other, the auxiliary device is provided at the first broad side, and the first broad side is substantially straight over a substantial portion of its length.

12. A vessel comprising:
a hull formed with an opening in a broad side of the hull,
an oil separating means for receiving oil and water and separating the oil from the water, the oil, separating means being located within the hull and being accessible from outside the hull through said opening, and
an auxiliary device that is movable with respect to the hull between a first position in which the auxiliary device blocks said opening and a second position in which the auxiliary device is deployed outboard of the vessel for cooperating with the hull in collecting oil and leading the oil and water through said opening to the oil separating means, wherein the auxiliary device comprises at least two wall members that are interconnected so that they are movable with respect to each other.

13. A vessel according to claim 12, wherein the wall members comprise a larger wall member that is turnable relative to the hull between a first position in which it blocks the opening in the broad side of the hull and a second position in which it is deployed outboard of the hull, and a smaller wall member that is attached to the larger wall member and is turnable relative to the larger wall member between a first position in which it blocks an opening in the larger wall member and a second position in which it is turned inward of the larger wall member relative to the hull.

* * * * *